(No Model.)
E. WESTON.
ELECTRICAL MEASURING INSTRUMENT.
No. 486,689. Patented Nov. 22, 1892.
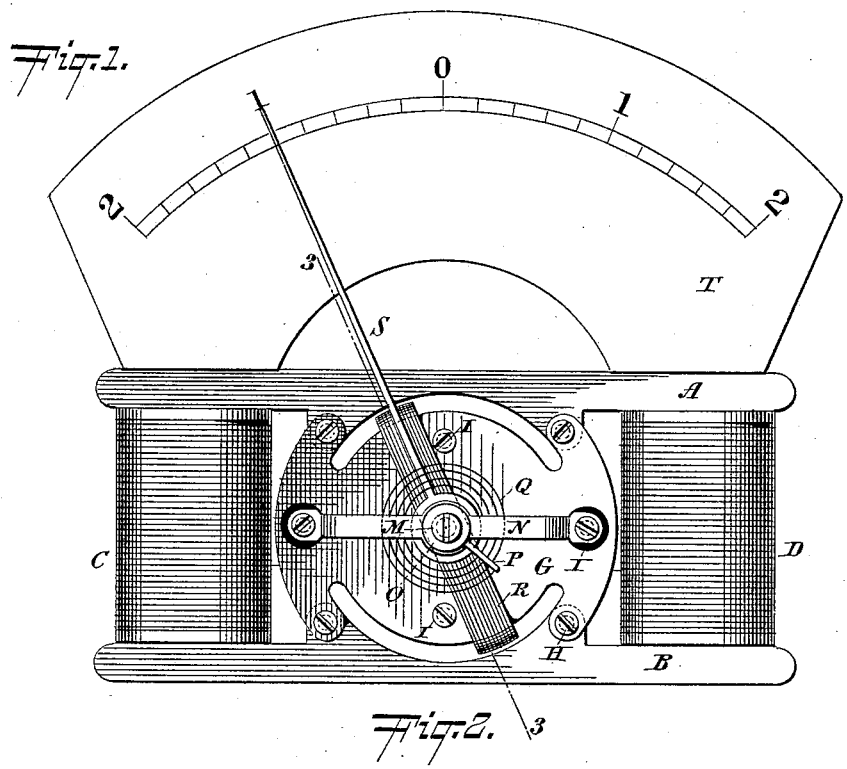
WITNESSES:
INVENTOR
Edward Weston
BY Park Benjamin
his ATTORNEY.

UNITED STATES PATENT OFFICE.

EDWARD WESTON, OF NEWARK, NEW JERSEY.

ELECTRICAL MEASURING-INSTRUMENT.

SPECIFICATION forming part of Letters Patent No. 486,689, dated November 22, 1892.

Application filed June 4, 1891. Serial No. 395,130. (No model.)

*To all whom it may concern:*

Be it known that I, EDWARD WESTON, of Newark, Essex county, New Jersey, have invented a new and useful Improvement in Electrical Measuring-Instruments, of which the following is a specification.

The invention relates to an electrical measuring-instrument intended more particularly for measuring difference in potential between its terminals.

The principle of the apparatus may be stated as follows: to construct and arrange a device containing a field produced by an electro-magnet, which field, despite changes in the current, shall nevertheless be practically and substantially uniform in strength; to dispose in said field and between the poles of the electro-magnet a coil, which when traversed by the current to be measured will normally tend to take a new position in said field, depending upon the difference of potential between the instrument terminals, and to arrange said coil so that its movement due to said difference of potential is opposed by an initial torque given to a spring which acts upon said coil. Consequently when the current is established it cannot deflect the coil until the turning moment of the latter exceeds the resistance of the spring, when a very slight increment of overbalancing force due to the current will produce a relatively-large movement of the coil and consequent large deflection of the needle. The greater the torque resistance to be overcome the more extensive will be the deflection of the index when the equilibrium is disturbed. The reading of the instrument is of course not proportional to the deflections, but to a function depending upon the torque of the spring and the deflecting moment due to the current, this being determinable once for all for any given instrument. The object of this construction is twofold: first, to enable an electro-magnet to be used in an instrument of this class to produce substantially the same results in permanency and uniformity of field as a permanent magnet, and, second, to cause the index of the instrument for a given change in electrical pressure to sweep over a long interval in arc, so that small changes in current may be easily perceived even at a considerable distance from the instrument.

I desire to call particular attention to the fact that there is not embodied in this instrument an electro-magnetic system constructed or wound so that the magnetic strength of the same varies with the strength of the current acting upon it. The electro-magnets, on the contrary, are to be so wound and constructed and the relation of the spring resistance to the movement of the coil is to be such that any current which is powerful enough to actuate the coil to move against the torque resistance of the spring is equally sufficient to magnetize the electro-magnets up to or practically up to saturation. This is essential, as will more particularly hereinafter appear.

In the accompanying drawings, Figure 1 is a side elevation of my instrument. Fig. 2 is a sectional view on the line 2 2 of Fig. 3, and Fig. 3 is a sectional view on the line 3 3 of Fig. 1.

Similar letters of reference indicate like parts.

A and B are the bodies of the electro-magnets, of which C and D are the coils. The magnet-poles at E and F are made concave. On the outer faces of the magnet-bodies and on each side thereof are covering-plates of brass or other non-magnetic material, one of which is shown at G. Said plate is secured to the magnet-bodies A and B by screws, as H. Fastened to the plates G by screws I is a mass of soft iron J, of I-shaped cross-section, carrying a longitudinally-wound coil of insulated wire K. This mass J forms an independent electro-magnet disposed with its poles opposite the oppositely-named concave poles E and F of the electro-magnets A B. The polar faces of the electro-magnet J are made convex, so that an annular or curved magnetic field is produced.

L is a shaft, which passes centrally through the electro-magnet J and has its extremities received in bearings, one of which is shown at M, which bearings are supported in bars N, secured to the covering-plates G. Upon each bearing M is a collar O, which may be rotated thereon and which carries a bent arm P, which is secured to the outer end of a coiled spring Q. The inner end of said coiled spring Q is fastened to the shaft L. The bar N is insulated from the plate G by pieces of rubber or other suitable material. A similar arrangement of coiled spring Q, supporting-bar N, movable arm P, and bearing M is on the opposite side of the apparatus and supports the other end of the shaft L. Carried by the shaft L is a coil R of fine insulated wire, which passes outside of the cover-plates G and through the annular space between the poles of the electro-magnets J and A B. Secured, also, upon the shaft L is an index-needle S, of aluminium or other light material, which moves over a suitably-marked scale-plate T, which is supported on the magnet-body A. The movable coil R and the fixed coils C, D, and K are preferably connected in series, the current, for example, passing from one terminal to the collar O, which may be insulated from the bearing M by a sleeve of rubber or any other suitable means to the arm P, spring Q, shaft L, coil R, and thence through the opposite spring, arm, and collar to one of the electro-magnet coils C or D, thence to the stationary coil K and to the other magnet-coil C or D, and so back to the other terminal.

As already fully shown in various other electrical measuring-instruments hitherto patented by me, I may vary the tension of the spring Q by suitably turning the bar P. In the present instrument I construct and arrange these springs so that their torque will normally hold the needle S against its stop at one end of its path. The instrument then is to be so adjusted that when a current having a pressure due to the normal working difference of potential in the circuit in which the device is to be used traverses the coils, then the spring will be so far overbalanced as to allow the needle to move to the zero-point marked on the middle part of the scale. The needle will remain at this point as long as the equilibrium is maintained; but at a very slight change in potential difference in the current it will, as already explained, swing over a large arc in one direction or the other. Of course, as already stated, the extent of movement of the needle will be an arbitrary distance, depending upon the construction of each apparatus; but, on the other hand, the extent of movement corresponding to a given change in potential may readily be determined once for all for each instrument. The object of the central electro-magnet J K is to intensify and render more uniform and permanent the annular field in which the coil R moves.

The electro-magnet coils C, K, and D are to be so proportioned that when the current is able to overcome the normal resisting torque of the springs its strength will be such as to bring the electro-magnets up to or very closely up to the point of saturation. In this way a field of uniform strength is produced and not a field which varies with every change in potential in the current which affects the instrument.

I claim—

1. In an electrical measuring-instrument, and in combination with an electro-magnetic system having a field of force which is substantially constant or not, varying with the strength of the current acting upon it, a loop-conductor movable in said field under the influence of a current, a spring opposing the movement of said conductor, and an index actuated by said conductor, the said parts being constructed and arranged so that a current due to a certain definite or working potential difference will cause said index to move to a definite position on the scale and there remain as long as said potential difference is maintained.

2. In an electrical measuring-instrument, and in combination with an electro-magnetic system having a field of force which is substantially constant or not, varying with the strength of the current acting upon it, a loop-conductor movable in said field under the influence of a current.

3. In an electrical measuring-instrument, and in combination with an electro-magnetic system having a field of force which is substantially constant or not, varying with the strength of the current acting upon it, a loop-conductor in circuit with said electro-magnetic system and movable in said field under the influence of the current which traverses both said conductor and said system.

4. In an electrical measuring-instrument, and in combination with an electro-magnetic system having a field of force which is substantially constant or not, varying with the strength of the current acting upon it, a loop-conductor movable in said field under the influence of a current and mechanism for opposing a definite initial resistance to the motion of said conductor.

5. In an electrical measuring-instrument, the combination of an electro-magnetic system and a movable electrical conductor, the said parts being disposed in mutual inductive proximity and constructed and arranged in circuit, so that a varying current traversing said system and said conductor may cause a constant or substantially-unvarying field by reason of magnetic saturation in said system and a varying field about said conductor.

6. In an electrical measuring-instrument, an electro-magnetic system and a movable electrical conductor, the said parts being disposed in mutual inductive proximity and being constructed and arranged so that a varying current traversing said system and said conductor may cause a constant or substantially-unvarying field by reason of magnetic saturation in said system and a varying field about said conductor, in combination with means for opposing the movement of said conductor due to the reaction of the said fields.

7. In an electrical measuring-instrument, an electro-magnetic system producing a field of force and a loop-conductor movable therein by a current traversing said conductor, the said parts being constructed and arranged so that a current causing a movement of said conductor in said field will also magnetize said electro-magnetic system to or practically to saturation.

8. In an electrical measuring-instrument, an electro-magnetic system producing a field of force, a loop-conductor movable therein, and a means of producing a definite mechanical resistance to the motion of said conductor, the aforesaid parts being constructed and arranged in circuit, so that a current traversing said conductor and said electro-magnetic system and causing said conductor to move against said mechanical resistance also magnetizes to saturation or practically to saturation said electro-magnetic system.

9. The combination, in an electrical measuring-instrument, of two magnets relatively arranged to produce an annular field of force, a conductor in loop form disposed and rotary in said field, and a spring opposing the movement of said conductor.

10. The combination, in an electrical measuring-instrument, of two magnets relatively arranged to produce an annular field of force, a conductor in loop form disposed and rotary in said field, a spring opposing the movement of said conductor, and means for adjusting said spring so that it may offer a definite resistance to the initial movement of said conductor.

11. The combination of the electro-magnets A B C D, cover-plates G, electro-magnet J K, supported between the poles of said magnets A B C D, and the pivoted coil R, disposed in the annular field between said electro-magnets, the said coil and electro-magnets being in circuit.

12. The combination of the electro-magnets A B C D, cover-plates G, electro-magnet J K, supported by said plates G and between the poles of said magnets A B C D, the pivoted coil R, disposed in the annular space between said electro-magnets, and the spring Q, secured to said coil-pivot and to an abutment, the said coil and electro-magnets being in circuit.

EDWARD WESTON.

Witnesses:
R. C. FESSENDEN,
A. F. CONERY, Jr.